BIDIRECTIONAL LOAD CURRENT SWITCHING CIRCUIT

Filed April 4, 1960 2 Sheets-Sheet 1

INVENTOR.
DONALD F. FRAIPONT
BY John V. Regan
ATTORNEY

Feb. 19, 1963 D. F. FRAIPONT 3,078,395

BIDIRECTIONAL LOAD CURRENT SWITCHING CIRCUIT

Filed April 4, 1960 2 Sheets-Sheet 2

INVENTOR.
DONALD F. FRAIPONT
BY John V. Regan
ATTORNEY

United States Patent Office 3,078,395

Patented Feb. 19, 1963

3,078,395
BIDIRECTIONAL LOAD CURRENT SWITCHING CIRCUIT

Donald F. Fraipont, Hightstown, N.J., assignor to Radio Corporation of America, a corporation of Delaware Filed Apr. 4, 1960, Ser. No. 19,555
7 Claims. (Cl. 317—148.5)

The present invention relates to an improved circuit for passing a current in either direction through a load. While not restricted thereto, the invention is especially suitable for applying read and write current pulses to ferrite cores, magnetic drums, or other memory circuits of electronic computers.

The circuit of the invention includes, in series, in the order named, a first switch circuit, a load, a bidirectional switch element, and a second switch circuit. Each switch circuit comprises a unidirectional switch element effectively in shunt with a bidirectional impedance element which, when the unidirectional switch element conducts, is of substantially larger impedance than the unidirectional switch element. The unidirectional switch elements are connected to conduct currents in opposite directions through the load. When one unidirectional switch element and the bidirectional switch element are enabled, and the other unidirectional switch element is not enabled, current may flow through the load in one direction, and when the other unidirectional switch element and the bidirectional switch element are enabled, and said one unidirectional switch element is not enabled, current may flow through the load in the opposite direction.

In a preferred form of the invention, the unidirectional switch elements are transistors and the bidirectional switch element is a bidirectional transistor. All transistors are of the same conductivity type. The use of only one conductivity type of transistor is advantageous in that it eliminates undesirable circulating currents and allows circuits preceding the transistors to be relatively simple.

The invention will be described in greater detail by reference to the following description taken in connection with the accompanying drawing in which.

Figure 1:
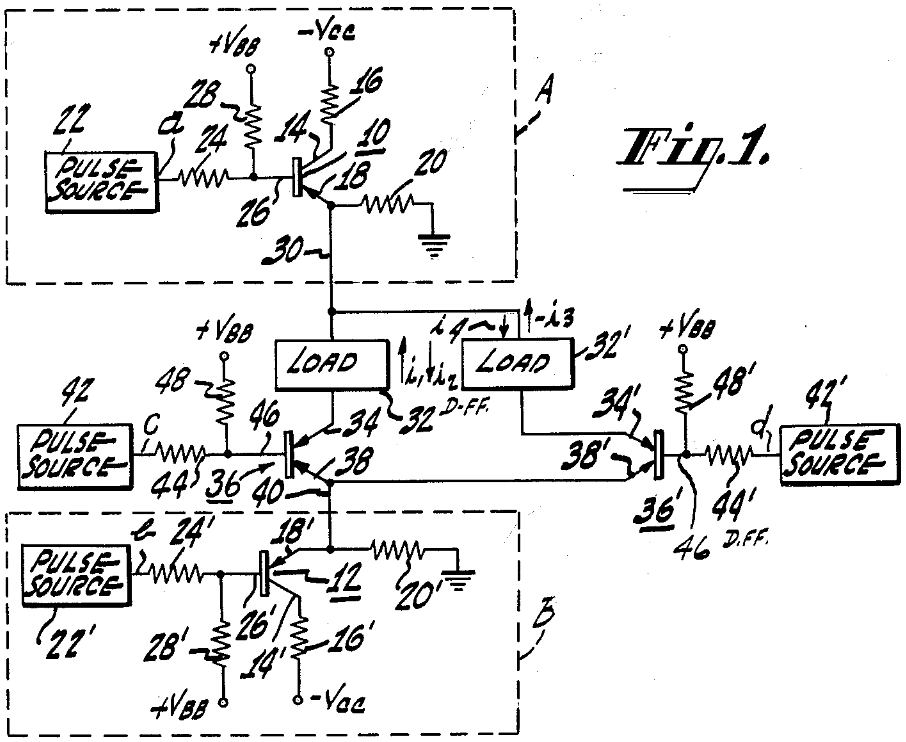
FIG. 1 is a block and schematic circuit diagram of a preferred form of the invention.

The circuit of FIG. 1 includes first and second PNP transistors 10 and 12, respectively. The collector 14 of first transistor 10 is connected through resistor 16 to a source of operating voltage $-V_{cc}$, and the emitter 18 of the first transistor 10 is connected through a resistor 20 to a point of reference potential, indicated as ground. The comparable electrodes of second transistor 12 are similarly connected and have similar reference numerals primed applied.

The input circuit to first transistor 10 includes a pulse source 22 connected through resistor 24 to the base 26. The first transistor 10 is normally maintained cut off by a positive voltage $+V_{bb}$ applied to the base through coupling resistor 28. Again, the input circuit to second transistor 12 is similar to the one of first transistor 10 and similar reference numerals primed have been applied to similar elements.

The emitter 18 of first transistor 10 is connected via lead 30 to one terminal of a load 32. As will be explained in more detail later, load 32 may be a memory element such as a ferrite core, the driving head for a magnetic drum, or for that mater, any other suitable load. The second terminal of the load is connected to one of the operating electrodes 34 of a bidirectional transistor 36. The second operating electrode 38 of bidirectional transistor 36 is connected via lead 40 to emitter 18'.

The input circuit for bidirectional transistor 36 includes a pulse source 42 which is connected through coupling resistor 44 to the base 46. The transistor is normally maintained cut off by a positive voltage $+V_{bb}$ applied through resistor 48 to the base 46.

A second load 32' and a bidirectional transistor 36' are connected in series with each other and in shunt across the first load 32 and bidirectional transistor 36. The second load 32' and second bidirectional transistor 36' have an input circuit similar to that of the first load 32 and first bidirectional transistor 36. The elements of the second load 32' and the second transistor 36' and their associated circuit elements have similar reference numerals primed applied as those of the first load 32 and bidirectional transistor 36.

Figure 2:
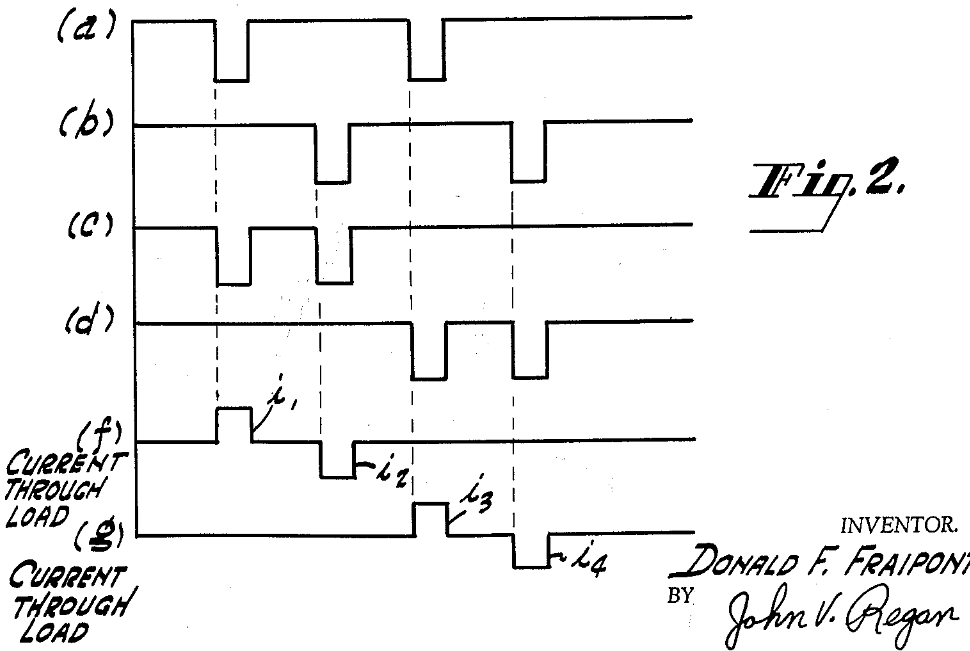
FIG. 2 is a drawing of waveforms, somewhat idealized, at various places in the circuit of FIG. 1.

The circuit operation may be better understood by referring to the waveforms shown in FIG. 2. All transistors shown are normally substantially cut off so that normally little current flows through load 32 or load 32'. Pulse source 22 applies the negative pulses *a* to the base 26 of first transistor 10. These, as well as pulses *b*, *c*, and *d* to be discussed shortly, are of suffcient amplitude to drive the transistor to which they are applied into heavy conduction. Pulse source 42 applies pulses *c* to the base of bidirectional transistor 36. The first of pulses *a* and *c* occur concurrently and drive transistors 10 and 36 into heavy conduction. During this interval, the other transistors 12 and 36' remain substantially cut off. The resulting current $i_1$ which flows passes through resistor 20', bidirectional transistor 36, first load 32 and transistor 10 in the direction indicated by arrow $i_1$.

Pulses *b* are applied by source 22' to transistor 12. The first of these pulses occurs coincidentally with the second of pulses *c* so that the second and bidirectional transistors 12 and 36 conduct heavily. During this interval, no pulse is applied to first transistor 10 and it is maintained cut off by the positive bias voltage applied to its base 26. Accordingly, during the interval of the first of pulses *b*, current $i_2$ flows from ground through resistor 20, through load 32, through bidirectional transistor 36, and through second transistor 12. It may be observed that the current $i_2$ is in a direction opposite to $i_1$ (see FIG. 2*f*).

Summarizing the operation above, when the first and bidirectional transistors 10 and 36 are driven into conduction concurrently, current passes through load 32 in one direction and when the bidirectional and second transistors 36 and 12 are driven into conduction concurrently, current passes through the load in the opposite direction. Resistors 20 and 20' act as bypass circuits. Resistor 20' conducts the current of transistor 10, when transistor 12 is cut off, and resistor 20 conducts the current of transistor 12 when transistor 10 is cut off. The resistance of resistors 20 and 20' is relatively high compared to that of transistors (10 and 12) when the transistors conduct, but not so high that the current passing through the load is reduced to any appreciable extent. For example, the resistance of a resistor 20 may be 10 or so times the value of a conducting transistor, however, the precise value is not critical. Typical circuit values are given later.

From the discussion above, the manner in which currents pass through load 32' will also be clear. The pulses applied to the bidirectional transistor 36' are as shown in FIG. 2*d* and the current passing through the load 32' is as shown in FIG. 2*g*.

Figure 3:
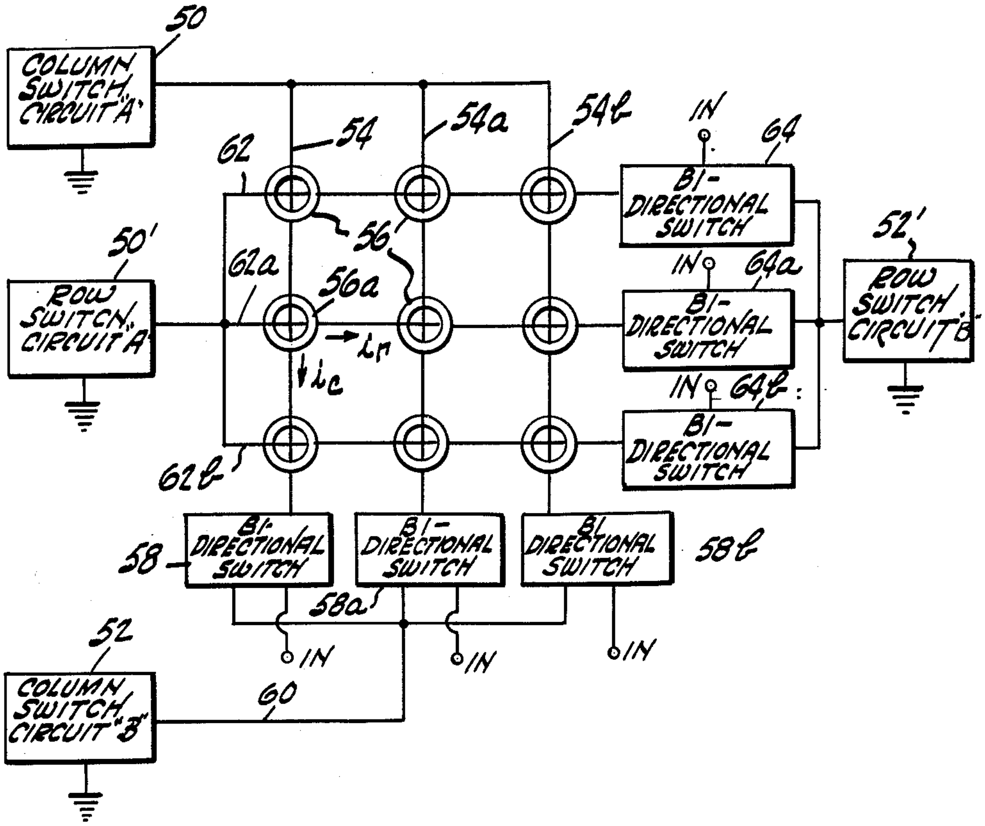
FIG. 3 is a block and schematic circuit diagram of a magnetic core, coincident current memory employing the circuit of the present invention.

A coincident current ferrite core memory employing the invention is shown in FIG. 3. Only three rows and three columns are shown. However, it is evident that many more of each may be used. Block 50 represents the circuit A shown in dashed lines in FIG. 1 and block 52 represents the circuit B shown in dashed lines in FIG. 1. The circuit represented by blocks 50' and 52' are similar. The circuit of block 50 applies its output pulses to a plurality of columns 54–54*b* of ferrite cores 56. Each column of cores is connected in series with a bidirectional switch circuit. These are shown at 58, 58*a*, 58*b*, respectively. Each bidirectional switch circuit includes a bidirectional transistor and an input circuit to the transistor as is shown in FIG. 1. The input connection is from a pulse source like 42 in FIG. 1, for example. All of the bidirectional switches 58–58*b* are connected via lead 60 to the switch circuit 52.

In a similar manner, the rows 62, 62*a*, and 62*b* of cores are connected in parallel to switch circuit 50'. There is a bidirectional switch individual to each row. These are legended 64, 64*a*, and 64*b*. The bidirectional switches are connected in common to row switching circuit 52'.

The magnetic core matrix itself is well known. Each core stores a binary bit of information. When the core is magnetized in one sense, it stores the binary digit one and when magnetized in the opposite sense, it stores the binary digit zero. In one mode of matrix operation, a "one" may be written into the core by applying coincident current pulses in one sense to the core during the write cycle and the core may be read out by applying coincident pulses of the opposite sense to it during the read cycle.

The operation of the circuit is clear from the discussion of FIG. 1. The specific example which follows tells how a binary digit "one" is written into a particular core. Assume first that coincident currents in the directions indicated by the arrows $i_c$ and $i_r$ are required to cause core **56*a* to store a "one." These may be produced as follows. The transistors in switches 58, 52, 64*a*, and 52' are pulsed on and the transistors in switches 50 and 50' are maintained cut off. This causes the coincident currents $i_c$ and $i_r$ to flow through core 56*a*. If all cores are originally magnetized in a sense to represent storage of the binary digit "zero," the core 56*a* and only 56*a*** will switch to store the binary digit "one." In a similar manner, the binary digit "one" may be written into any other core in the matrix. The read operation is similar and need not be discussed in detail. The separate sense winding is not shown for convenience of drawing.

A typical circuit according to the circuit of FIG. 1 may have the following circuit parameters.

| | |
|---|---|
| Transistors **10** and **12** | Type 2N580. |
| Bidirectional transistor **36** | Type TA–1703B. |
| Resistors **20** and **20'** | 10 ohms. |
| Resistors **16** and **16'** | 30 ohms. |
| Resistors **28** and **28'** | 1600 ohms. |
| $-V_{cc}$ | $-15$ volts. |
| $+V_{bb}$ | $+15$ volts. |

In the circuit described, all transistors are of PNP type. It is to be understood that the invention is equally applicable to the case in which all transistors are of NPN type provided proper power supplies and biasing sources are employed.

What is claimed is:

1. A series circuit including, in the order named, a first switch circuit; a load; a bidirectional switch element; and a second switch circuit, each said switch circuit including a unidirectional switch element effectively in shunt with a bidirectional impedance element, said unidirectional switch elements being connected to conduct current in opposite directions through the series circuit, whereby, when one unidirectional switch element and the bidirectional switch element are enabled, and the other unidirectional switch element is not enabled, current may flow through the load in one direction, and when said other unidirectional switch element and the bidirectional switch element are enabled, and said one unidirectional switch element is not enabled, current may flow through the load in the opposite direction.

2. In combination, a series circuit including, in the order named, a first unidirectional transistor, a load, a bidirectional transistor, and a second unidirectional transistor, all transistors being of the same conductivity type and the two unidirectional transistors being connected to carry current in opposite directions; and a bypass circuit effectively in shunt with each unidirectional transistor, whereby when one unidirectional transistor and the bidirectional transistor are enabled and the other unidirectional transistor is not enabled, current passes in one direction through the load, and when said other unidirectional transistor and said bidirectional transistor are enabled and said one unidirectional transistor is not enabled, current passes in the opposite direction through said load.

3. In combination, a series circuit including, in the order named, the emitter-to-collector circuit of a first unidirectional transistor, a load, the emitter-to-collector circuit of a bidirectional transistor, and the emitter-to-collector circuit of a second unidirectional transistor, all transistors being of the same conductivity type and the two unidirectional transistors being connected to carry current through the load in opposite directions; a bypass circuit for the first unidirectional transistor connected to a point in the series circuit between the first transistor and the load; and a bypass circuit for the second transistor connected to a point in the series circuit between the second transistor and the load, whereby when one unidirectional transistor and the bidirectional transistor are driven into conduction and the other unidirectional transistor is disabled, current passes in one direction through the load, and when said other unidirectional transistor and said bidirectional transistor are driven into conduction and said one unidirectional transistor is disabled, current passes in the opposite direction through said load.

4. In the combination as set forth in claim 3, each said bypass circuit comprising a resistor.

5. In the combination as set forth in claim 3, each said bypass circuit comprising a resistor connected between the emitter of its transistor and ground.

6. In combination, a series circuit including, in the order named, a first unidirectional transistor, a load, a bidirectional transistor, and a second unidirectional transistor, all transistors being of the same conductivity type and the two unidirectional transistors being connected to carry current in opposite directions; a bypass circuit effectively in shunt with each unidirectional transistor, whereby when one unidirectional transistor and the bidirectional transistor are enabled and the other unidirectional transistor is disabled, current passes in one direction through the load, and when said other unidirectional transistor and said bidirectional transistor are enabled and said one unidirectional transistor is disabled, current passes in the opposite direction through said load; and a plurality of other circuits, each connected across the subcricuit consisting of the load and bidirectional transistor, each said other circuit comprising a bidirectional transistor and load connected in series.

7. In the combination as set forth in claim 6, each load comprising a magnetic element.

References Cited in the file of this patent

UNITED STATES PATENTS

| | | |
|---|---|---|
| 2,885,570 | Bright et al. | May 5, 1959 |
| 2,939,119 | Einsele | May 31, 1960 |